United States Patent
Kumar et al.

(10) Patent No.: US 11,233,696 B1
(45) Date of Patent: Jan. 25, 2022

(54) PRECONFIGURING A DEVICE FOR A NETWORK

(71) Applicant: Amazon Technologies, Inc., Seattle, WA (US)

(72) Inventors: Lomash Kumar, Redmond, WA (US); Bradley Jeffery Behm, Seattle, WA (US); Jijo Raphael Jose, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/934,827

(22) Filed: Mar. 23, 2018

(51) Int. Cl.
| | |
|---|---|
| *H04L 12/24* | (2006.01) |
| *H04W 4/50* | (2018.01) |
| *H04W 12/06* | (2021.01) |
| *H04L 29/06* | (2006.01) |
| *H04L 9/32* | (2006.01) |
| *H04W 88/08* | (2009.01) |

(52) U.S. Cl.
CPC ........ *H04L 41/0803* (2013.01); *H04L 9/3247* (2013.01); *H04L 63/0823* (2013.01); *H04L 63/0869* (2013.01); *H04W 4/50* (2018.02); *H04W 12/06* (2013.01); *H04W 88/08* (2013.01)

(58) Field of Classification Search
CPC ... H04L 41/0803; H04L 4/50; H04L 63/0823; H04L 63/0869; H04L 9/3247; H04W 12/06

USPC ........................................................ 709/203
See application file for complete search history.

(56) References Cited

U.S. PATENT DOCUMENTS

| | | | | |
|---|---|---|---|---|
| 9,210,192 | B1* | 12/2015 | Kim ...................... | H04W 12/06 |
| 10,419,908 | B1* | 9/2019 | Hutz ..................... | H04W 60/00 |
| 2006/0064588 | A1* | 3/2006 | Tidwell ............... | H04L 41/5067 713/169 |
| 2013/0269011 | A1* | 10/2013 | Wilson .................. | H04L 63/08 726/6 |

OTHER PUBLICATIONS

Wikipedia, "IEEE 802.11," Wikipedia, the Free Encyclopedia, page last modified Feb. 7, 2017, retrieved Feb. 13, 2017, https://en.wikipedia.org/wiki/IEEE_802.11, 9 pages.

* cited by examiner

*Primary Examiner* — James E Springer
*Assistant Examiner* — Patrick F Ngankam
(74) *Attorney, Agent, or Firm* — Davis Wright Tremaine LLP

(57) ABSTRACT

A technology is described for connecting a device to a network. An example method may include identifying a preinstalled network configuration for a default wireless network from device memory. The preinstalled network configuration may be used by the device to connect to the default wireless network and obtain a local network configuration for a local wireless network. Thereafter, the device may disconnect from the default wireless network and connect to the local wireless network using the local network configuration.

20 Claims, 10 Drawing Sheets

PRECONFIGURING A DEVICE FOR A NETWORK

BACKGROUND

Electronic devices have become ever-present in many aspects of society. During the course of a normal day, a person may use a smart phone, a tablet device, and a laptop computer. Automobiles and commercial vehicles have also come to rely upon electronic systems to control and monitor many features and operations. Modern home appliances such as, washers, dryers, and refrigerators may be driven and controlled by electronic systems. Manufacturing facilities, building heating and cooling systems, and farming equipment may now rely upon electronic sensors and control systems.

Advancements in communication technologies have allowed for even relatively simple electronic devices to communicate with other devices and computing systems over a computer network. For example, an electronic device in a manufacturing system may monitor various aspects of the manufacturing process and communicate monitoring data to other devices in the manufacturing system. Similarly, electronic sensors embedded in a building control system may monitor and communicate details regarding operation of a building's heating, cooling, and ventilation systems. Even home appliances offer the possibility of being configured with communication capabilities for the purpose of transmitting status and receiving external control communications. Quite often, the communication of electronic devices with one another using a network may take place using a wireless access point to make a connection with the network.

DETAILED DESCRIPTION

Figure 1:
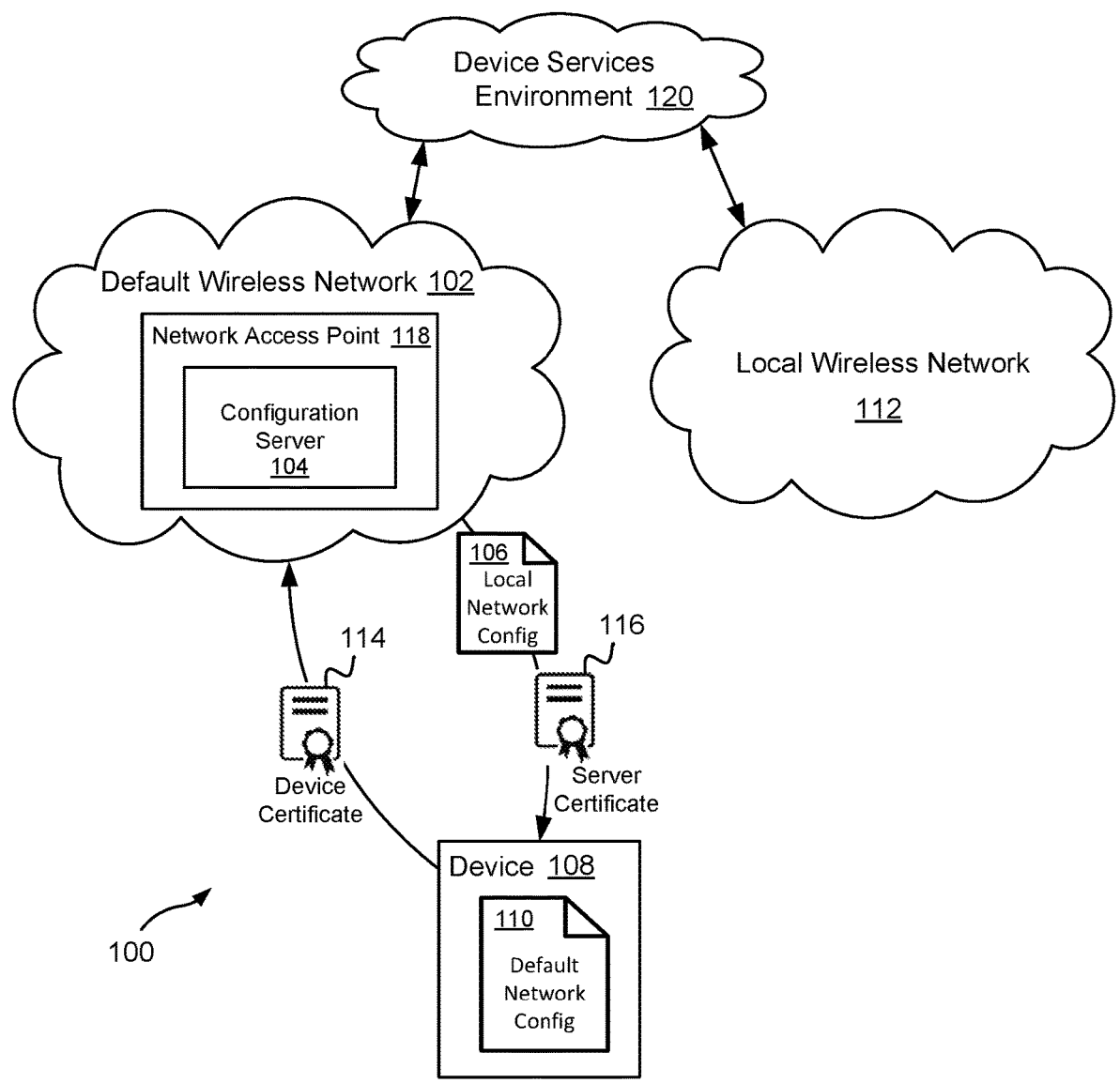
FIG. 1 is a diagram illustrating an example system and method for obtaining a local network configuration file for a local wireless network from a default wireless network.

Technologies are described for connecting a device to a local wireless network using a local network configuration obtained from a default wireless network. A device may be preconfigured to connect to a default wireless network (e.g., a WI-FI access point, Zigbee router, wireless router, etc.) in order to obtain a local network configuration that enables the device to connect to a local wireless network and access a device services environment accessible through the local wireless network. A default wireless network may be a temporary network, or a limited use network, located on local or customer premises. The default wireless network may be used to host a configuration server that provides devices with a local network configuration for a local wireless network. A local wireless network may be a home network or a business network (wireless local area network (WLAN)) that provides access to a wide area network (WAN) (e.g., the internet) and a device services environment.

In one example, a device may be configured to determine whether a local network configuration for a local wireless network is stored on the device. For example, after being powered on, the device may determine whether the device has been configured to connect to a local wireless network. In the case that the device is not configured to connect to a local wireless network, the device may retrieve a preinstalled network configuration file for a default wireless network from device memory. The preinstalled network configuration file (also referred to herein as a default network configuration file) may be installed on the device prior to providing or shipping the device to a customer, and the preinstalled network configuration file may include preconfigured network credentials for connecting the device to the default wireless network.

The device may connect to the default wireless network using network parameters and/or network credentials included in the preinstalled network configuration file. Thereafter, the device may obtain a local network configuration file from a configuration server included in the default wireless network. In one example, obtaining the local network configuration file may include performing mutual authentication between the configuration server and the device using a device certificate preinstalled on the device. After obtaining the local network configuration file from the configuration server, the device may disconnect from the default wireless network and connect to the local wireless network using the local network credentials included in the local network configuration file.

In the past, a device having the ability to connect to a wireless network had to be manually configured before the device could be connected to a local wireless network. For example, a customer would have had to manually enter network credentials or network parameters for a local wireless network, or manually upload a network configuration for the local wireless network to the device. The present technology provides a solution to manual configuration of a device to connect to a wireless network. More specifically, the present technology provides improvements associated with configuring a device to connect to a local wireless network by preconfiguring the device to connect to a default wireless network that provides the device with a local network configuration for the local wireless network. As such, the present technology provides a technological improvement associated with automating local wireless network configuration of a device.

To further describe the present technologies, examples are now provided with reference to the figures. FIG. 1 is a diagram illustrating a high level example of a system 100 for automating configuration of a device 108 to connect to a local wireless network 112. In particular, FIG. 1 illustrates that the system 100 may be used to provide a local network configuration file 106 for a local wireless network 112 to a device 108.

A device 108 may be one of many physical electronic devices that create a large network of addressable devices. This entire "network" is commonly referred to as the Internet of Things (IoT). The devices that make up the network may be addressable over a wireless network, such as WI-FI, Zigbee, Z-Wave, BLUETOOTH, NFC (Near Field Communication), cellular, and the like. A device 108 may be configured to communicate with computing resources located in a device services environment 120 (e.g., a "cloud" environment) described later in relation to FIG. 7. For example, a device 108 may communicate with the device services environment 120 to access network services, such as data storage and retrieval services, on-demand processing capacity, and other services.

In the example illustrated in FIG. 1, a device 108 may be preconfigured to connect to a default wireless network 102 and obtain a local network configuration file 106 that enables the device 108 to connect to a local wireless network 112 and communicate with a device services environment 120. A local wireless network 112 may be a wireless local area network ("WLAN"), such as a business' wireless local area network that includes multiple access points within business premises, or a customer's home wireless network provided by a customer router device. The local wireless network 112 may provide access to a wide area network ("WAN") that, in turn, provides access to a device services environment 120.

A default wireless network 102 may be a temporary network or an isolated network hosted on a computing device (shown in FIG. 3) on a customer's premises. The computing device may provide a network access point 118 to the default wireless network 102. As one example, a customer may be a business that utilizes a number of devices 108 for business operations. The customer may dedicate a computing device with wireless network capabilities (e.g., a local server or computer) to hosting a default wireless network 102 that is limited to providing devices 108 (e.g., when added to business operations) with a local network configuration file 106 for connecting to the business' local wireless network 112.

As another example, a customer may be an individual who may set up a temporary default wireless network 102 on a customer computing device having wireless network capabilities (e.g., a mobile device or computer) by installing networking software, such as a default networking application (e.g., configuration server), on the customer computing device. A device 108 may connect to the computing device hosting the default wireless network 102 to obtain a local network configuration file 106 for the customer's local wireless network, and thereafter the customer can shut down the temporary default wireless network 102 hosted on the computing device.

As part of setting up the default wireless network 102 on a customer computing device, a customer may provide network parameters and credentials for the customer's local wireless network 112, and the network parameters and credentials may be included in a local network configuration file 106 that may be stored on the default wireless network 102. A device 108 may connect to the default wireless network 102 and obtain the local network configuration file 106 from the default wireless network 102. In particular, as described below, the default wireless network 102 may include a configuration server 104 which may be used to provide the local network configuration file 106 to the device 108. In one example, after installing networking software that includes the configuration server 104, a customer may be prompted for network parameters and credentials for the customer's local wireless network 112 and the network parameters and credentials may be securely stored in a local network configuration file 106 on the customer computing device. In another example, a customer may store a local network configuration file 106 for the customer's local wireless network 112 in the device services environment 120 so that the local network configuration file 106 may be available to the default wireless network 102. For example, the configuration server 104 included in the default wireless network 102 may retrieve the local network configuration file 106 from the device services environment 120 after set up of the default wireless network 102 on a customer computing device, or in response to a request received from a device 108.

After powering on a device 108 or upon occurrence of a particular event (e.g., a user request or application request), the device 108 may perform a network configuration procedure that determines, in part, whether the device 108 has been configured to connect to a local wireless network 112. The network configuration procedure may be performed anytime that the device 108 needs to establish or reestablish a network connection with the local wireless network 112. In the case that the device 108 has not been configured to connect to a local wireless network 112, the device 108 may connect to a default wireless network 102 using a default network configuration file 110 preinstalled on the device 108. For example, because configuration settings for a local wireless network 112 may not be known at the time that a device 108 is shipped to a customer, a manufacturer, distributor, or retailer, prior to shipping the device 108 to the customer, may install a default network configuration file 110 on the device 108. A default network configuration file 110 may include information needed to connect to the default wireless network 102. For example, a default network configuration file 110 may include, but is not limited to, a default network identifier (e.g., a service set identifier ("SSID"), personal area network ("PAN") identifier, etc.), a default network password (e.g., key or passphrase), and/or a security encryption type (e.g., WI-FI protected access ("WPA")).

In one example, for a device 108 that has already been configured to connect to a local wireless network 112, the network configuration procedure may further include determining whether a local network configuration file 106 stored on the device 108 is still valid for the local wireless network 112. In the case that the local network configuration file 106 is no longer valid, the device 108 may connect to the default wireless network 102 using the default network configuration file 110 preinstalled on the device 108.

In one example, the default wireless network 102 may broadcast a default network identifier that corresponds to a network identifier included in a default network configuration file 110 preinstalled on a device 108. The device 108 may send a network probe request to determine the availability of the default wireless network 102 using the default network identifier obtained from the default network configuration file 110. In the case that the default wireless network 102 is available (e.g., the device 108 receives a probe response from the default wireless network 102), the device 108 may request to connect to the default wireless network 102. In one example, the default wireless network 102 may be unsecured and may allow the device 108 to connect to the default wireless network 102 without having to present network credentials (e.g., a network login and/or password). Simply having the default network identifier may be enough in this configuration. In another example, the default wireless network 102 may be a secured network and the device 108 may need to provide valid network credentials to a network access point in order to connect to the default wireless network 102. Network credentials for the default wireless network 102 may be included in a default network configuration file 110 preinstalled on the device 108. The network credentials may be obtained from the default network configuration file 110 and presented to the network access point 118 for authentication.

In one example, a default network identifier (e.g., an SSID) for the default wireless network 102 may be used to authenticate, or may be used in part to authenticate a device 108 requesting to connect to the default wireless network 102. As one example, a default network identifier may include device identifying information that a network access point 118 may use to authenticate a device 108 requesting to connect to the default wireless network 102. For example, the default network identifier may include a name of the default wireless network 102 and a device identifier for a device 108, or a portion of the device identifier. As an example, a default network name for the default wireless network 102 may be "CONFIG_HOTSPOT" and a device identifier may be "DEVICE_1575". The default network name and device identifier can be combined to create "CONFIG_HOTSPOT-DEVICE_1575", which may be used as the default network identifier for the default wireless network 102. In another example, a device identifier for a device 108 may be used as a default network identifier for the default wireless network 102. As an example, the device identifier "DEVICE_1575" may be used as a default network identifier for the default wireless network 102. In one configuration, the device identifier may represent a class or group of devices.

In another example, a default network identifier (e.g., an SSID) for the default wireless network 102 may be hidden. That is, the default wireless network 102 may be configured to not broadcast a default network identifier for the default wireless network 102 and the device 108 may be configured to automatically connect to the default wireless network 102, when the default wireless network 102 is available, using a preinstalled default network configuration file 110 for the default wireless network 102.

After connecting to the default wireless network 102, the device 108 may obtain a local network configuration file 106 for a local wireless network 112 from a configuration server 104 accessible via the default wireless network 102. In the example illustrated in FIG. 1, the default wireless network 102 may host the configuration server 104. The configuration server 104 may be server software executing on a customer's computing device used to host the default wireless network 102, or the configuration server may be a separate physical server on customer premises that may be accessible via the default wireless network 102. For example, as part of configuring a computing device to host the default wireless network 102, the computing device can be configured to host a configuration server 104 and the configuration server 104 may be assigned an internal network address associated with the default wireless network 102. Also, a server certificate 116 used for mutual authentication may be installed on the configuration server 104.

In one alternative configuration, a device 108 may connect to the configuration server 104 using a default wireless network address (e.g., internet protocol ("IP") address). In one example, the network address for the configuration server 104 may be specified in the default network configuration file 110 preinstalled on the device 108. For example, the default network configuration file 110 may specify an IP address and port (e.g., "192.168.1.100:8080") for the configuration server 104 which a device 108 may use to connect to the configuration server 104. In another example, the device 108 may obtain a network address for the configuration server 104 by querying the network access point 118 (e.g., using network commands) for an IP address and port for the configuration server 104. The device 108 can then use the IP address and port received from querying the network access point 118 to connect to the configuration server 104. In yet another example, a network address for the configuration server 104 may be shared with a device 108 during network protocol setup with the default wireless network 102. For example, a device 108 may be provided with a network address for the configuration server 104 as part of a dynamic host configuration protocol (DHCP) exchange, where a DHCP server provides the network address along with an IP address and other network configuration parameters assigned to the device 108.

The configuration server 104, in one example, may be secured and may perform device authentication when a device 108 requests to connect to the configuration server 104. In one example, as part of a connection request, the device 108 may provide device credentials (e.g., a device certificate 114, token, username-password, etc.) that may be used to authenticate the device 108, allowing the device 108 to securely connect to the configuration server in order to obtain a local network configuration file 106. For example, the device 108 may present a device certificate 114 to the configuration server 104. The device certificate 114 may be preinstalled on the device 108 and the device certificate 114 may include a public key of a public key-private key pair used to authenticate the device certificate 114. As another example, mutual authentication may be performed between the device 108 and the configuration server 104. For example, in response to a device request for a local network configuration file 106, the configuration server 104 presents the device 108 with a server certificate 116 and the device 108 verifies the server certificate 116 using a public key-private key pair or another verification method. The device 108 then presents the configuration server 104 with a device certificate 114, and the configuration server 104 verifies the device certificate 114 using a public key-private key pair or another verification method. After the server certificate 116 and the device certificate 114 have been verified, the configuration server 104 may provide the local network configuration file 106 to the device 108.

Alternatively, the configuration server 104 may be unsecured, and as such, authentication may not be performed when a device 108 requests that the configuration server 104 provide a local network configuration file 106 to the device 108. For example, in a case where the default wireless network 102 may be temporary, the configuration server 104 may be left unsecured to allow a device 108 to obtain a local network configuration file 106 from the configuration server 104, and thereafter the default wireless network 102 may be terminated or turned off. As another example, security used to access the default wireless network 102 may be sufficient to secure a local network configuration file 106 from unauthorized access.

In an alternative example, the configuration server 104 may be located in the device services environment 120 and the configuration server 104 may be accessible through the default wireless network 102. For example, the default wireless network 102 may be hosted using a customer computing device that has access to a wide area network providing access to the device services environment 120, where the configuration server 104 may be located. A device 108 may connect to the default wireless network 102, as explained above, and the device 108 may access the configuration server 104 located in the device services environment 120 through the default wireless network 102. For example, the network access point 118 for the default wireless network 102 may direct a request for a local network configuration file 106 received from the device 108 to the configuration server 104 hosted in the device services environment 120.

As described earlier, a local network configuration 106 may be stored on the default wireless network 102, or stored in the device service environment 120. The configuration server 104 may obtain the local network configuration 106 and provide the local network configuration 106 to a device 108. In one example, the configuration server 104, via a customer computing device, may prompt a customer for the local network configuration 106, wherein a customer may input network parameters and/or network credentials for the customer's local wireless network 112 using a graphical user interface, and the local network configuration 106 obtained from the customer may be provided to a device 108.

Figure 2:
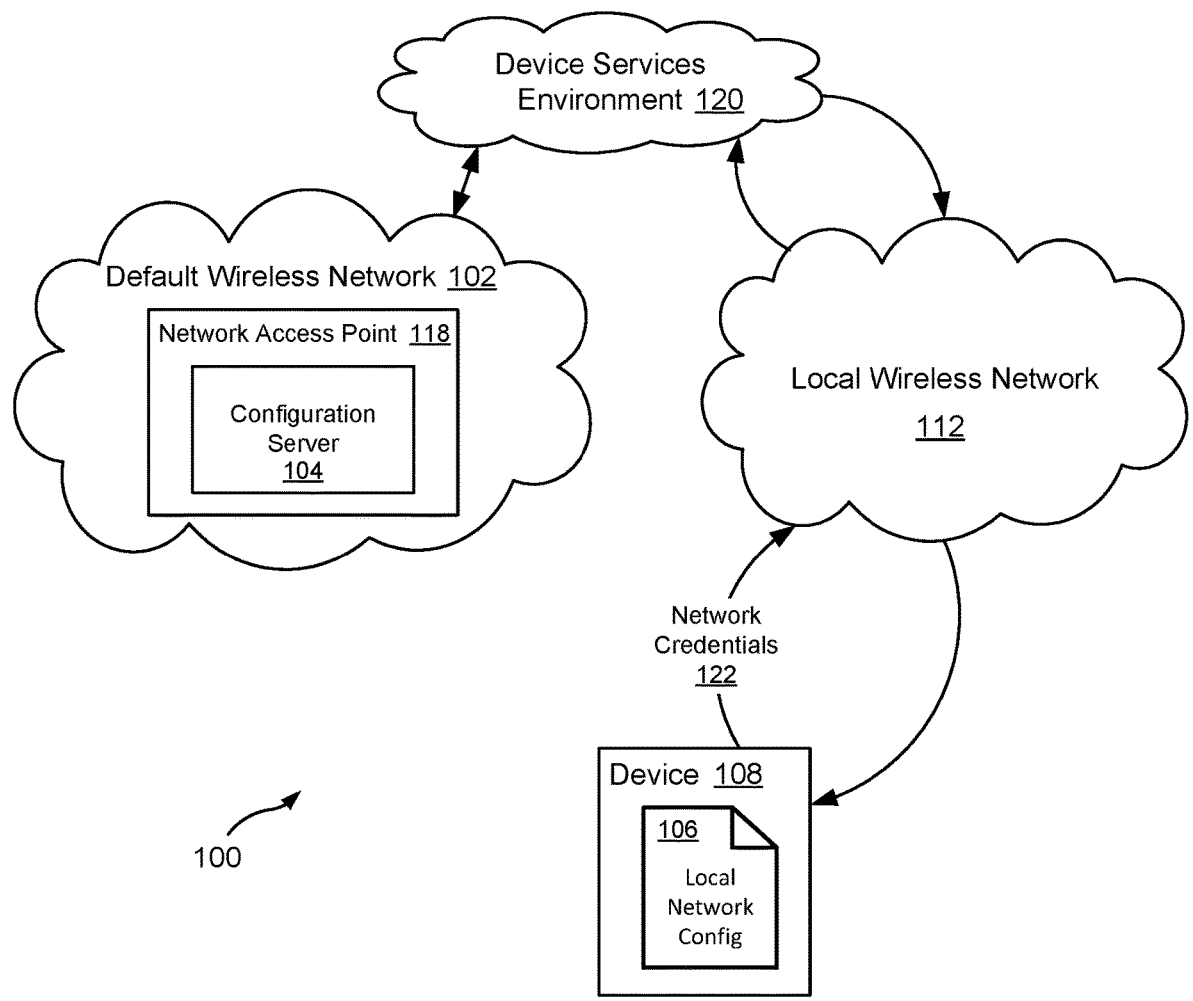
FIG. 2 is a diagram that illustrates an example system and method for connecting a device to a local wireless network using a local network configuration file.

As illustrated in FIG. 2, after obtaining a local network configuration file 106 from the configuration server 104 hosted on the default wireless network 102, a device may use the local network configuration file 106 to connect to a local wireless network 112. As described earlier, the local wireless network 112 may be a wireless local area network for a business or a customer home and the local wireless network 112 may provide access to a wide area network ("WAN") providing access to a device services environment 120. The local network configuration file 106 may include, but is not limited to, a local network identifier (e.g., a SSID or PAN identifier), a local network password (e.g., key or passphrase), and/or a security encryption type (e.g., WI-FI protected access ("WPA")). The device 108 may use a local network identifier included in the local network configuration file 106 to send a network probe request to determine the availability of the local wireless network 112, and in response to receiving a probe response from an access point (e.g., a router device) included in the local wireless network 112, the device 108 may provide network credentials 122 included in the local network configuration 106 to the access point for authentication. After successful authentication of the network credentials 122, the device 108 may now be connected to the local wireless network 112, and the device 108 may access computing resources located in the device services environment 120.

Also, after obtaining the local network configuration file 106 from the configuration server 104 hosted on the default wireless network 102, the device 108 may store the local network configuration file 106 to device memory, allowing the device 108 to reuse the local network configuration file 106 to connect to the local wireless network 112 as needed. For example, where the device 108 may be restarted, or the local wireless network 112 may be disrupted, the device 108 may be configured to identify whether the local network configuration file 106 is stored in device memory, and connect to the local wireless network 112 using network parameters and credentials included in the local network configuration file 106. In the event that the local network configuration file 106 is not stored on device memory, or the local network configuration file 106 is no longer valid (e.g., network credentials for the local wireless network 112 have been rotated), the device 108 may connect to the default wireless network 102 to obtain the local network configuration file 106.

Figure 3:
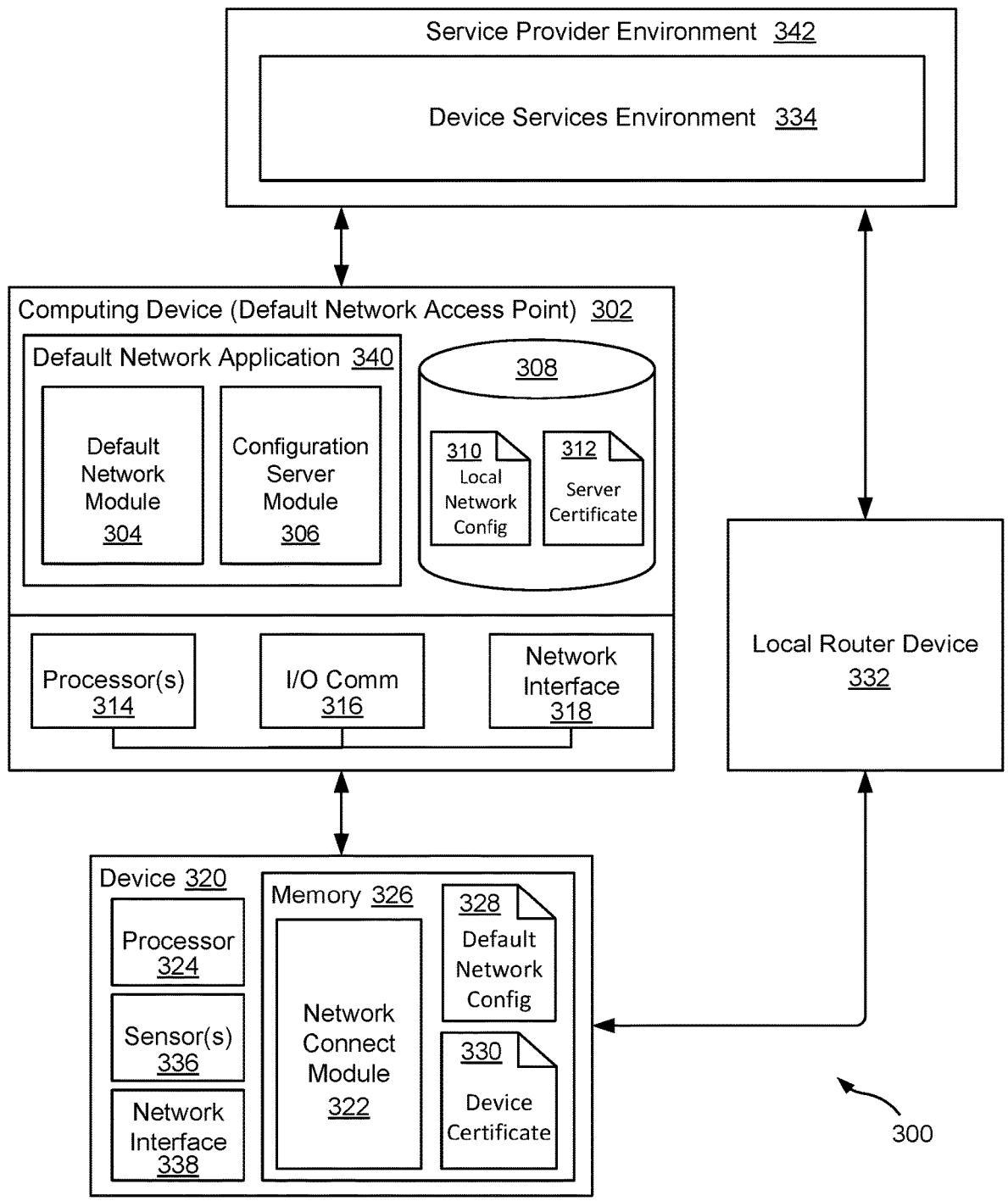
FIG. 3 is a block diagram that illustrates various example components included in a system for automating configuration of a device to connect to a local wireless network.

FIG. 3 illustrates components of an example system environment 300 on which the present technology may be executed. The system environment 300 may include a device 320 preconfigured to connect to a default wireless network, a computing device 302 configured to host a default wireless network, one or more local router devices 332 that provide access points to the local wireless network, and a device services environment 334 included within a service provider environment 342, described later in relation to FIG. 7 and FIG. 8.

The device 320 may include a network connect module 322 located in device memory 326 and executable by the processor 324. The network connect module 322 may be configured to determine whether the device 320 may be configured to connect to a local wireless network (e.g., the device 320 has a local network configuration file 310 stored in device memory 326), and obtain the local network configuration file 310 from a configuration server (implemented by a configuration server module 306) hosted in a default wireless network when the local network configuration file 310 does not exist in device memory 326. The network connect module 322 may be executed as part of a network configuration procedure after powering on, or restarting the device 320. Also, the network connect module 322 may be executed in the event that a network connection to a local wireless network is disrupted.

In one example, the network connect module 322 may include instructions, that when executed by the processor 314, determine whether a local network configuration file 310 for a local wireless network may be stored on device memory 326. In the case that a local network configuration file 310 is not stored on device memory 326, the instructions may retrieve a default network configuration file 328 for a default wireless network from device memory 326. In one example, the device memory 326 may include a preinstalled file folder that contains a default network configuration file 328, device certificate 330, and other files. The default network configuration file 328 may include preconfigured network parameters and network credentials for the default wireless network. The instructions may retrieve the default network configuration file 328 from device memory 326 and use the network parameters and network credentials included in the default network configuration file 328 to connect to the default wireless network.

After connecting to the default wireless network, the instructions may obtain a local network configuration file 310 for the local wireless network from a configuration server module 306 included in the default wireless network. The local network configuration file 310 may contain network parameters and network credentials for the local wireless network. In one example, the local network configuration file 310 may be signed using a cryptographic signature (e.g., a digital signature) generated using a customer's private key, or a third-party private key (e.g., certificate authority or certification authority). The configuration server may be implemented on the computing device 302 using a configuration server module 306 described below.

In one example, the configuration server may authenticate the device 320 using a device certificate 330 received from the device 302 as previously preinstalled on device memory 320. In another example, mutual authentication may be used to obtain a local network configuration file 310 from the configuration server. Mutual authentication may be performed using a device certificate 330 preinstalled on device memory 326 and a server certificate 312 installed on the computing device 302. In the case that the local network configuration file 310 is signed using a cryptographic signature, the device 320 may authenticate the cryptographic signature using a public key preinstalled on the device 320.

After obtaining the local network configuration file 310 from the computing device 302, the instructions executed by the processor 324 may cause the device 320 to disconnect from the default wireless network and connect to the local wireless network (via a local router device 332) using network parameters and network credentials included in the local network configuration 310. In an alternative configuration, a device 302 may include networking hardware (e.g., a LAN port) that allows the device 302 to be connected to a default wired network and obtain network credentials for a local wired network or local wireless network using the techniques described above.

A device 320 may be one of many devices included in the system environment 300 configured to utilize computing resources located in the device services environment 334. In one example, the device 320 may include a chipset, such as a microcontroller, a SoC (System on a Chip), or an embedded system. Illustratively, a microcontroller may include one or more processors 324, memory 326, network interface 318, and may have, or interface with, one or more Input/Output (I/O) peripherals. A SoC may integrate a microcontroller (or microprocessor) with additional "on-board" peripherals like a network interface 338, sensors 336, coprocessor, etc. The chipset may have device software, such as a real-time operating system ("RTOS") and any needed drivers and libraries, installed on the chipset. Illustratively, device drivers and libraries may include, but are not limited to, microcontroller drivers, peripheral drivers, network protocol libraries (e.g., MQTT, CoAP, HTTP, and HTTPS), computing resource libraries, and the like.

The computing device 302 may host a default network application 340 that includes a default network module 304 used to implement a default wireless network. The default network module 304 may include a networking operating system and/or network protocol software. As described earlier, a default wireless network may be a temporary and/or an isolated network used to provide a device 320 with a local network configuration file 310 for a local wireless network providing access to computing resources included in a device services environment 334. The default network module 304 may include instructions, that when executed by a processor 314, implement a default wireless network on the computing device 302, where the computing device 302 may act as an access point for the default wireless network. Illustratively, the default network module 304 may implement a default wireless network using WI-FI based on IEEE 802.11 standards, Zigbee, Z-Wave, BLUETOOTH, NFC, cellular, or any other appropriate network technology. The default wireless network may be secured or unsecured depending upon the type of network selected. A device 320 may connect to the default wireless network via a network interface 338 (e.g., network interface card ("NIC") included in the computing device 302.

In one example, the default network application 340 may include a configuration server module 306 used to implement a configuration server on the computing device 302. The configuration server module 306 may include instructions, that when executed by a processor 314, perform authentication (e.g., device authentication or mutual authentication) in response to a connection request from a device 320 and sends a local network configuration file 310 to the device 320. In one example, the configuration server module 306 may include instructions, that when executed, implement an API (application programming interface) for requesting a local network configuration file 310 from the configuration server. For example, a device 320 may be preconfigured to obtain a local network configuration file 310 from the configuration server by sending an API request to the configuration server. In another example, the configuration server may be hosted in the device services environment 334 and a device 320 may access the configuration sever via a default wireless network implemented on the computing device 302.

The computing device 302 may include any device capable of hosting a default wireless network. For example, the computing device 302 may be a device such as, but not limited to, a desktop computer, laptop or notebook computer, tablet computer, handheld computer, smartphone device, or other devices with like capability. The computing device 302 may include Input/Output (I/O) communication components 316 that may be used to obtain local network parameters and credentials from a customer.

The computing device 302 may include a data store 308 used to store electronic files, such as a local network configuration file 310 and a server certificate 312. The term "data store" may refer to any device or combination of devices capable of storing, accessing, organizing and/or retrieving data. Storage system components of the data store 308 may include storage systems such as a SAN (Storage Area Network), cloud storage network, volatile or non-volatile RAM, optical media, or hard-drive type media. The data store 308 may be representative of a plurality of data stores as can be appreciated.

API calls, procedure calls or other network commands that may be made in relation to the modules and services included in the system environment 300 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

A network providing access the device services environment 334 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof. While FIG. 3 illustrates an example of a system that may implement the techniques above, many other similar or different environments are possible. The example environments discussed and illustrated above are merely representative and not limiting.

Figure 4:
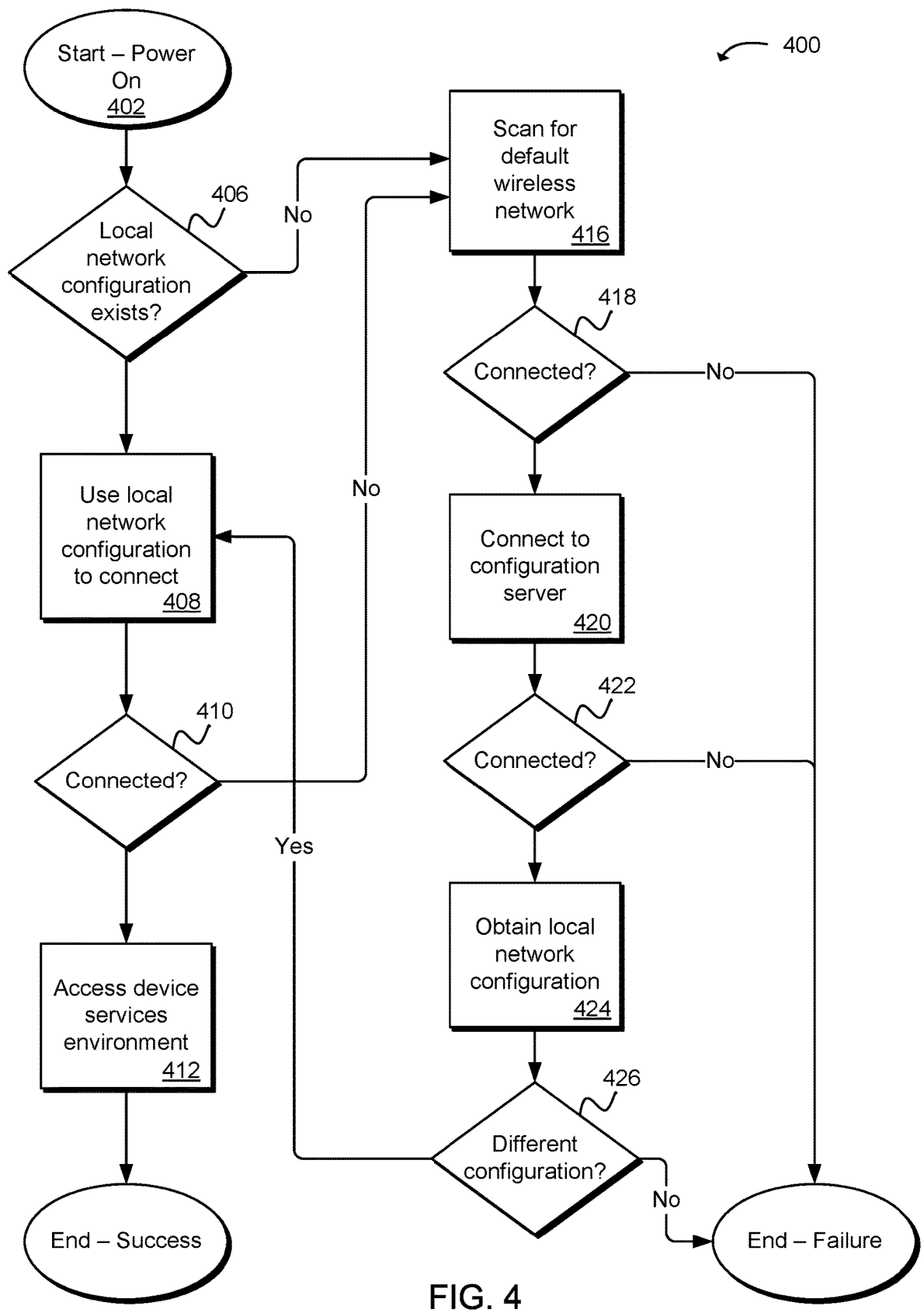
FIG. 4 is a flow diagram illustrating an example method for connecting a device to a local wireless network.

Moving now to FIG. 4, a flow diagram illustrates an example method 400 for connecting a device to a local wireless network. The device may be preconfigured to connect to a default wireless network to obtain a local network configuration that enables the device to connect to a local wireless network and access a device services environment.

The method may be initiated with powering on the device 402. The device may be configured to perform a network configuration procedure that includes determining whether a local network configuration exists in a device memory, as in block 406. For example, the device may have previously been configured to connect to a local wireless network using a local network configuration which may have been stored to the device. In the case that a local network configuration exists on the device, then as in block 408, the local network configuration may be used to connect to the local wireless network and access a device services environment, as in block 412. In the event that the local network configuration is no longer valid (e.g., due to password rotation) and the device is unable to connect to the local wireless network using the local network configuration, as in block 410, then the device may be configured to scan for the default wireless network, as in block 416.

Referring back to block 406, in the event that a local network configuration does not exist in device memory, the device may be configured to connect to the default wireless network. As in block 416, the device may scan for the default wireless network. For example, the device may obtain a default network identifier (e.g., SSID, PAN identifier, etc.) for the default wireless network from a default network configuration file that has been preinstalled in device memory. The device may send a network probe request to determine the availability of the default wireless network associated with the default network identifier. In the case that the default wireless network is available, the device may connect to the default wireless network using network parameters and/or network credentials included in the default network configuration file.

In the case that the device is able to connect to the default wireless network, as in block 418, then as in block 420, the device may connect to a configuration server through the default wireless network. In one example, the device may connect to the configuration server using a network address of the configuration server and a device certificate obtained from device memory. For example, the device may include a preinstalled file folder on device memory that contains a default network configuration file, network path file, and a device certificate. The default network configuration file may include preconfigured network parameters and network credentials for the default wireless network. The network path file may include configuration server information, such as a network address of the configuration server and an authentication protocol (e.g., device authentication or mutual authentication) used to connect to the configuration server. The device certificate may be used to authenticate the device or may be used to perform mutual authentication with the configuration server.

As in block 422, in the case that the device is able to connect to the configuration server (e.g., authentication is successful), as in block 424, the device may obtain a local network configuration from the configuration server and use the local network configuration to connect to the local wireless network, as in block 408. In one example where an existing local network configuration stored on the device is determined to be invalid, thereby causing the device to obtain a new local network configuration from the configuration server, the device may compare existing local network configuration with the new local network configuration to, as in block 426, and determine whether the new local network configuration is different from the existing local network configuration. In the case the new local network configuration is different, then as in block 408, the device may use the new local network configuration to connect to the local wireless network.

Figure 5A:
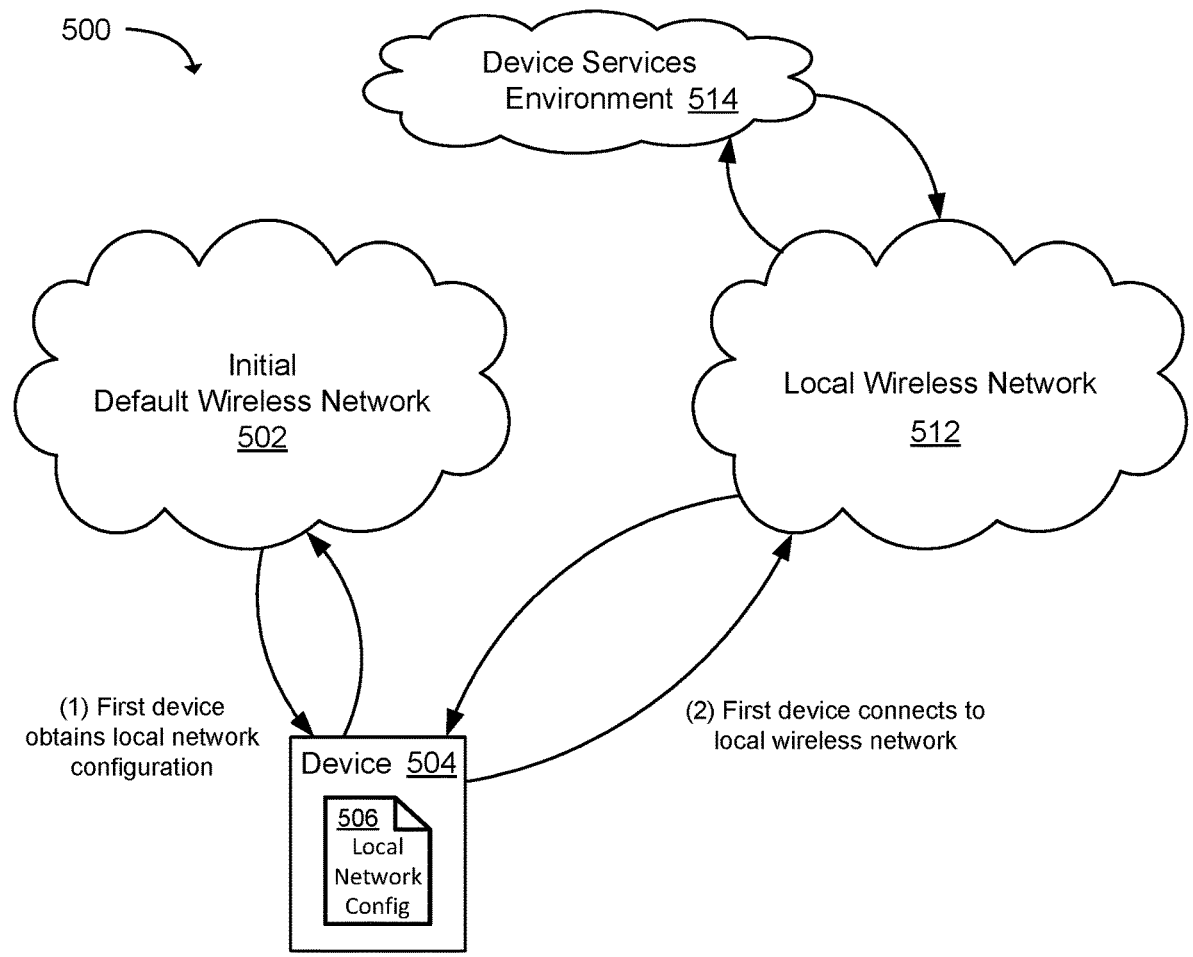
FIGS. 5A and 5B are flow diagrams that illustrate an example system and method for obtaining a local network configuration file from a device included in a network of devices.
Figure 5B:
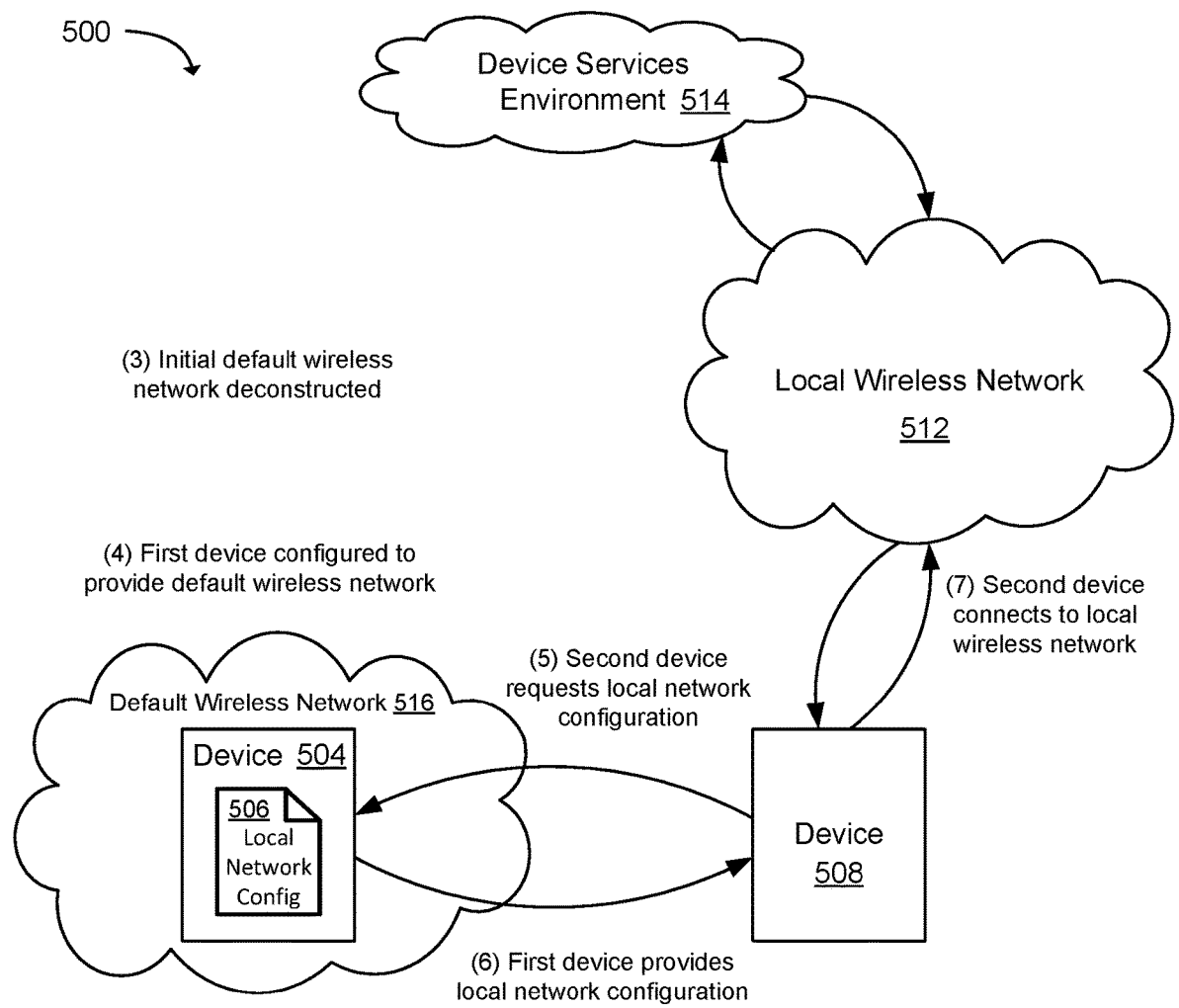

FIG. 5A is a flow diagram illustrating an example system and method 500 for obtaining a local network configuration file 506 for a local wireless network 512 from a device 504 included in a network of devices that are connected to the local wireless network 512. As described earlier in relation to FIG. 1 and FIG. 2, a device 504 may connect to a default wireless network to obtain a local network configuration file 506 for a local wireless network 512. In one example, as shown in FIGS. 5A and 5B, the device 504 may connect to an initial default wireless network 502, which may be deconstructed (e.g., a temporary endpoint or server may be shut down) after the device 504 obtains a local network configuration file 506 for a local wireless network 512 from the initial default wireless network 502. Thereafter, the device 504 may disconnect from the initial default wireless network 502 and connect to the local wireless network 512 using network parameters and/or network credentials included in the local network configuration file 506.

FIG. 5B illustrates that after the device 504 (hereinafter the first device 504) is configured for the local wireless network 512, the first device 504 may be used to provide the default wireless network 516 and the local network configuration to a second device 508 subsequently added to a network of devices configured to connect to a device services environment 514 through the local wireless network 512. In one example, the first device 504 may act as a node of the default wireless network 502 providing a secured or unsecured access point to the default wireless network 502. Also, in some examples, the first device 504 may act as a configuration server, from which, the second device 508 may request the local network configuration file 506. A leader election technique or another appropriate technique may be used to determine which device included in a network of devices will act as a default wireless network node and/or configuration server.

As part of adding the second device 508 to the network of devices, the second device 508 may perform a network configuration procedure that scans for an access point to the default wireless network 502. The second device 508 may identify a network identifier for the default wireless network being broadcast by the first device 504 and connect to the first device 504 using network parameters and/or network credentials included in a default network configuration file preinstalled on the second device 508.

After connecting to the first device 504, the second device 508 may request that the first device 504 provide the local network configuration file 506 to the second device 508. In one example, the first device 504 may act as a configuration server, and as such, may authenticate the second device 508 prior to providing the local network configuration file 506 to the second device 508. For example, the first device 504 may be configured to perform device authentication using a device certificate preinstalled on the second device 508, or the devices 504 and 508 may perform mutual authentication using a device certificate preinstalled on the second device 508 and a server certificate stored on the first device 504.

The first device 504 may send the local network configuration file 506 to the second device 508. The second device 508 may disconnect from the first device 504 and connect to the local wireless network 512 using network parameters and network credentials included in the local network configuration file 506, enabling the second device 508 to access network services included in the device services environment 514. While FIG. 5 depicts two devices 504 and 508, it will be appreciated that a network of devices can include any number of devices which may obtain a local network configuration file 506 from a device acting as node for the default wireless network 502.

Figure 6:
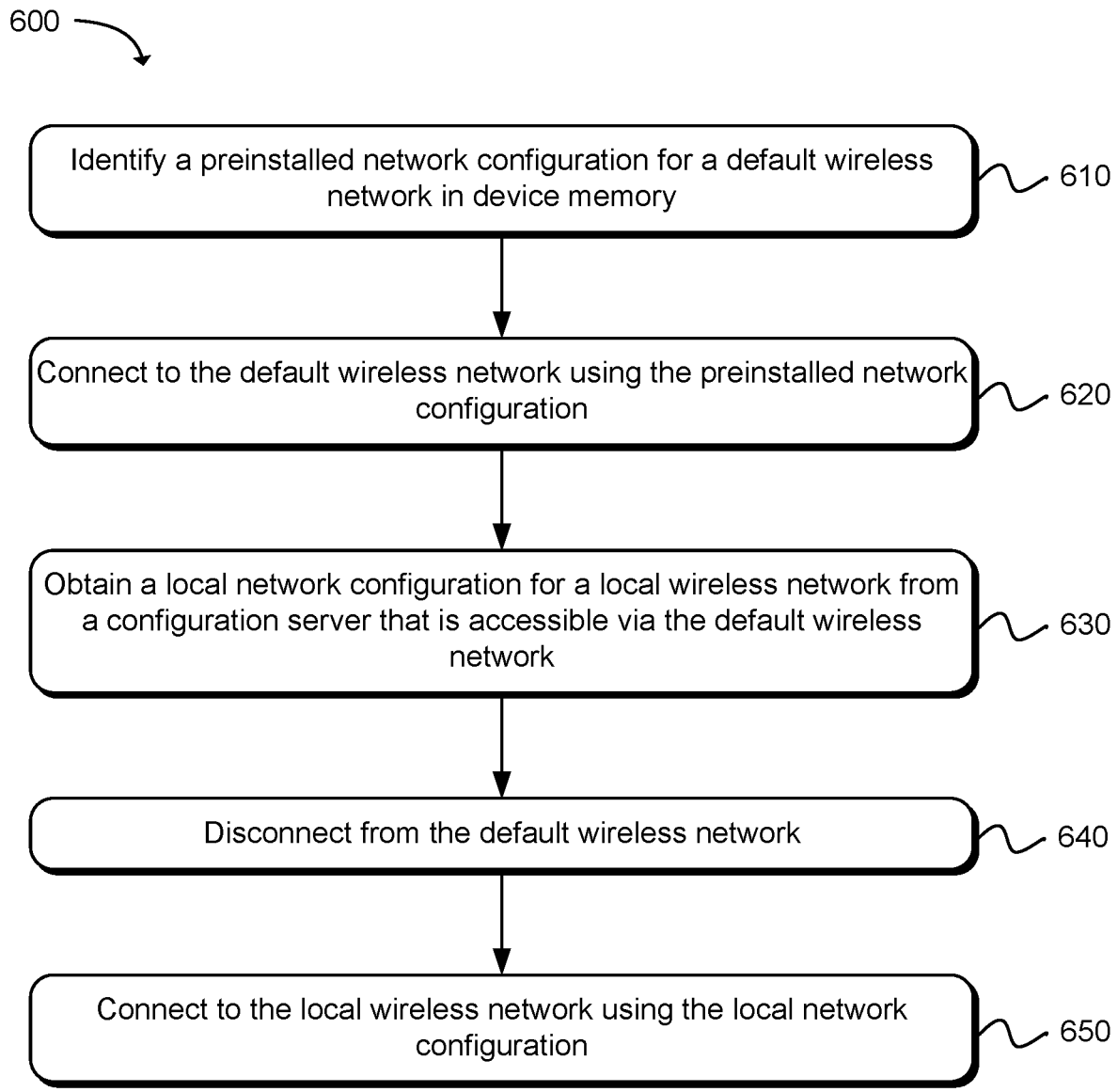
FIG. 6 is a flow diagram illustrating an example method for connecting a device to a local wireless network using a local network configuration obtained from a default wireless network.

FIG. 6 is a flow diagram that illustrates an example method for connecting a device to a local wireless network using a local network configuration obtained from a default wireless network. The method may include, as in block 610, identifying a preinstalled network configuration for a default wireless network from device memory after powering on a device. In one example, the device may be configured to first determine whether a local network configuration is stored on the device memory, and if not, the device may obtain the preinstalled network configuration for the default wireless network from device memory. A user device, such as a customer's computing device, may be configured to host the default wireless network.

As in block 620, the method 600 may include connecting to the default wireless network using the preinstalled network configuration. In one example, the device may be configured to identify a default network identifier for the default wireless network in the preinstalled network configuration, and send a network probe request to determine availability of the default wireless network specified by the default network identifier. Also, the device may be configured to identify network credentials for the default wireless network in the preinstalled network configuration, and provide the network credentials to an access point for the default wireless network for authentication.

As in block 630, the method 600 may include obtaining a local network configuration for a local wireless network from a configuration server that is accessible via the default wireless network. In one example, the device may be configured to obtain the local network configuration from a configuration server hosted within the default wireless network. A user device configured to host the default wireless network may also be used to host the configuration server. The configuration server may be assigned an internal network address associated with the default wireless network, and a server certificate may be installed on the user device, which may be used to perform mutual authentication with a device requesting a local network configuration. In one example, a device may retrieve a network address for the configuration server from a preinstalled network configuration, and the device may send a request for a local network configuration to the configuration server. As part of requesting the local network configuration from the configuration server, the device may present a device certificate preinstalled on device memory to the configuration server for authentication along with a request that the configuration server provide the local network configuration. In another example, mutual authentication may be performed by the device and the configuration server using the device certificate and the server certificate mentioned above. In a different example, the default wireless network may direct a request for a local network configuration received from a device to a configuration server hosted in a device services environment.

After obtaining the local network configuration, as in block 640, the method 600 may include disconnecting from the default wireless network, and as in block 650, connecting to the local wireless network using the local network configuration. Also, after obtaining the local network configuration, the local network configuration may be stored to device memory, wherein a subsequent network configuration procedure performed by the device may identify the local network configuration in the device memory and connect to the local wireless network using the local network configuration.

Figure 7:
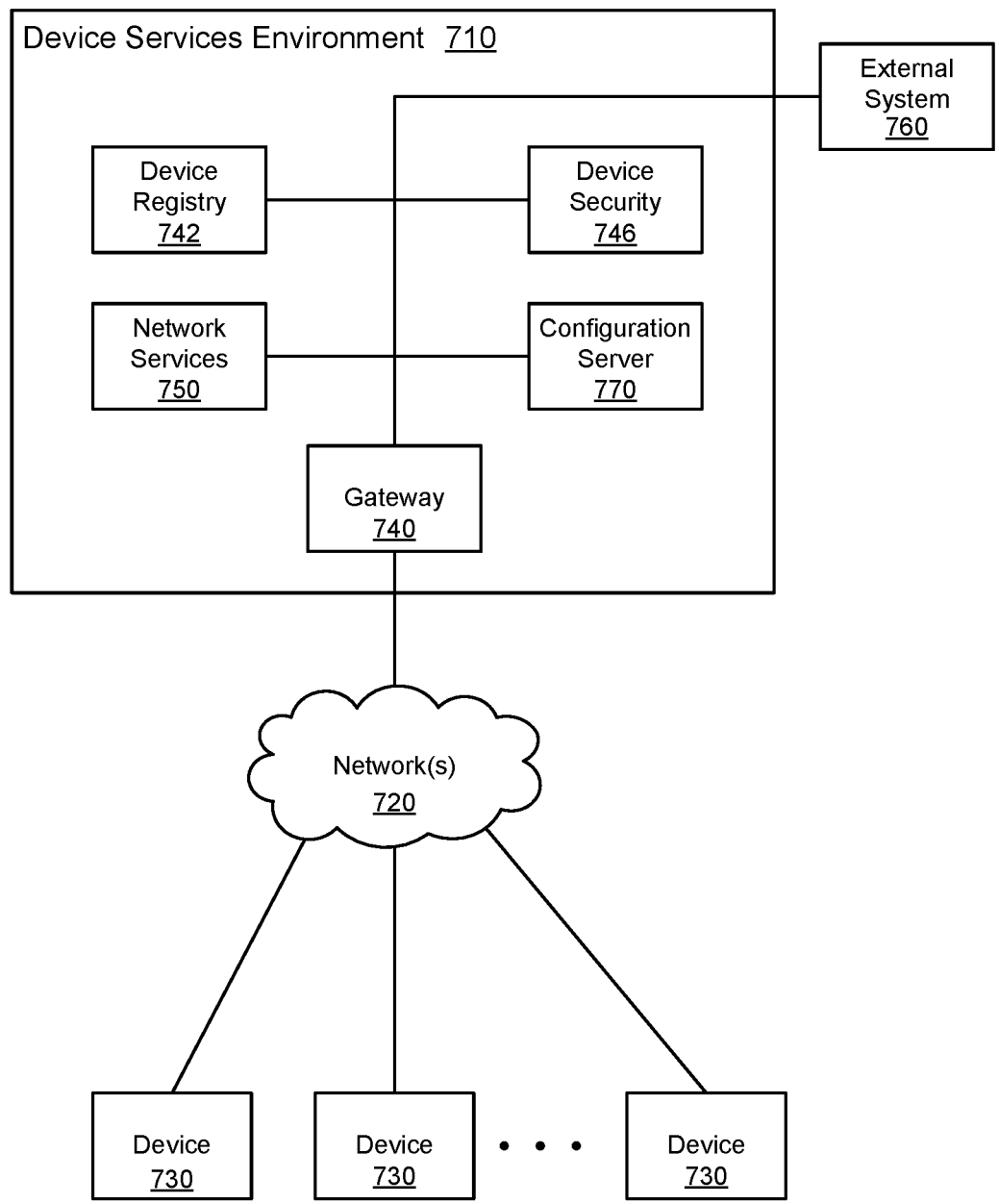
FIG. 7 is a block diagram illustrating an example computer networking architecture for a device services environment.

FIG. 7 is a block diagram illustrating an example device services environment 710 with which the devices described earlier may communicate. The device services environment 710, which may be referred to as a device communication environment or system that comprises various resources made accessible via a gateway server 740 to devices 730 that access the gateway server 740 via a network 720, such as a local wireless network that provides access to a wide area network. The devices 730 may access the device services environment 710 in order to access network and device services, such as data storage and computing processing features. Services operating in the device services environment 710 may communicate data and publication messages to the devices 730 in response to requests from the devices 730 and/or in response to computing operations within the services.

The device services environment 710 may comprise communicatively coupled component systems 740, 742, 746, 750 and 770 that operate to provide services to the devices 730. The gateway server 740 may be configured to provide an interface between the devices 730 and the device services environment 710. The gateway server 740 receives requests from the devices 730 and forwards corresponding data and publication messages to the appropriate systems within the device services environment 710. Likewise, when systems within the device services environment 710 attempt to communicate data instructions to the devices 730, the gateway server 740 routes those requests to the correct device 730.

The gateway server 740 may be adapted to communicate with varied devices 730 using various different computing and communication capabilities. For example, the gateway server 740 may be adapted to communicate using either TCP (Transmission Control Protocol) or UDP (User Datagram Protocol) protocols. Likewise, the gateway server 740 may be programmed to receive and communicate with the devices 730 using any suitable protocol including, for example, MQTT (Message Queue Telemetry Transport), CoAP (Constrained Application Protocol), HTTP (Hypertext Transfer Protocol), and HTTPS (HTTP secure). The gateway server 740 may be programmed to convert the data and instructions or publication messages received from the devices 730 into a format that may be used by other server systems comprised in the device services environment 710. In one example, the gateway server 740 may be adapted to convert a publication message received using the HTTPS protocol into a JSON (JavaScript Object Notation) formatted publication message that is suitable for communication to other servers within the device services environment 710.

The gateway server 740 may store, or may control the storing, of information regarding the devices 730 that have formed a connection to the particular gateway server 740 and for which the particular gateway server 740 may be generally relied upon for communications with the device 730. In one example, the gateway server 740 may have stored thereon information specifying the particular device 730 such as a device identifier. For each connection established from the particular device 730, the gateway server 740 may also maintain information identifying the connection. For example, a connection identifier may be generated and stored for each connection established with a particular device 730. Information relating to the particular connection may also be stored. For example, information identifying the particular socket of the gateway server 740 on which the connection was established, as well as information identifying the particular protocol used by the device 730 on the connection may be stored by the gateway server 740.

Information such as the socket and protocol may be used in order to facilitate further communications via the particular connection.

In one example, the gateway server 740 may communicate via any suitable networking technology with a device registry server 742. The device registry server 742 may be adapted to track the attributes and capabilities of each device 730. In an example, the device registry sever 742 may be provisioned with information specifying the attributes of the devices 730. The device registry server 742 may comprise data specifying rules or logic (e.g., automation rules) for handling various requests that may be received from the devices 730. The device registry server 742 may be programmed to convert specialized device functions or commands received in particular communication protocols such as, for example HTTPS, MQTT, CoAP, into functions or commands using particular protocols that are understood by other of the servers in the device services environment 710. In one example, the device registry server 742 may be provisioned with information specifying that upon receipt of a particular request from a particular device 730, a request should be made to store the payload data of the request in a particular network service server 750. The device registry server 742 may be similarly programmed to receive requests from servers 742, 750 and convert those requests into commands and protocols understood by the devices 730.

In some examples, the device services environment 710 may include a configuration server 770 that provides local network configurations to devices 730. Customers of a service provider may store network configurations for their local wireless networks in the device service environment 710 for distribution to devices 730 via the configuration server. Illustratively, a device 730 may connect to a default wireless network as previously described. The default wireless network may provide access to a wide area network that allows the device 730 to send a request for a local network configuration to the configuration server 770. The request may include information that can be used to identify a local network configuration associated with a particular customer.

The device security server 746 maintains security-related information for the devices 730 that connect to the device services environment 710. In one example, the device security server 746 may be programmed to process requests to register devices 730 with the device services environment 710. For example, entities such as device manufacturers, may forward requests to register devices 730 with the device services environment 710. The device security server 746 receives registration requests and assigns unique device identifiers to devices 730 which use the device identifiers on subsequent requests to access the device services environment 710. The device security server 746 stores, for each registered device, authentication information that may be provided during the device registration process. For example, a request to register a device 730 may comprise information identifying the device 730 such as a device serial number and information for use in authenticating the device 730. In one example, the information may comprise a digital certificate and may comprise a public key of a public key-private key pair. The information may be stored in relation to the assigned device identifier for the particular device 730. When the device 730 subsequently attempts to access the device services environment 710, the request may be routed to the device security server 746 for evaluation. The device security server 746 determines whether authentication information provided in the request is consistent with the authentication information stored in relation to the device identifier and provided during the registration process.

The device security server 746 may be further programmed to process request to associate particular entities (individuals or organizations) with particular devices 730. The device security server 746 may be adapted to receive requests to register entities, which may be, for example, individuals, users, accounts, and/or organizations, as authorized to control or communicate with a particular device 730. In one example, a request may be received from an individual or organization that may have purchased a device 730 from a manufacturer. For example, the device may be a dishwasher, thermostat, or lighting assembly that an individual or organization purchased from the manufacturer. The individual or organization may initiate a request to register the device 730 with the individual or an organization with which the organization is associated. The request may be routed to a web services server which may be comprised in device services environment 710 or which communicates the request to the device services environment 710. The request identifies the device 730 and the particular entity (individual or organization) that is requesting to be associated with the device 730. In one example, the request may comprise a unique device identifier that was assigned when the device 730 was registered with the system. The request further may comprise information uniquely identifying the entity that is registering as having authority to communicate with and/or control the particular device 730.

The device security server 746 stores the information identifying the particular entity in relation with the device identifier. When the particular entity subsequently attempts to control or communicate data to the particular device 730, the device security server 746 may use the information to confirm that the particular entity is authorized to communicate with or control the particular device 730. When an entity that has not been registered as being authorized to communicate with the device 730 attempts to communicate with or control the device 730, the device security server 746 may use the information stored in the device security server 746 to deny the request.

A network services server 750 may be any resource or processing server that may be used by any of servers 740, 742, 746, or 770 in processing requests from the devices 730. In one example, network services server 750 may provide data storage and retrieval services and/or on-demand processing capacity. In an example scenario, the network services server 750 may be any of numerous network accessible services including, for example, web or cloud-based services. In one example, the web services server 750 may be programmed to provide particular processing for particular devices 730 and/or groups of devices 730.

Servers 740, 742, 746, 750, and 770 may be communicatively coupled via any suitable networking hardware and software. For example, the servers may communicate via a local area network or wide area network.

An external system 760 may access device services environment 710 for any number of purposes. In one example, an external system 760 may be a system adapted to forward requests to register devices 730 with the device services environment 710. For example, an external system 760 may include a server operated by or for a device manufacturer that sends requests to device services environment 710, and device security server 746 in particular, to register devices 730 for operation with device services environment 710. Similarly, the external system 760 may be a system operated to provide a gateway for entities (individuals or organizations) to register an ownership or control relationship with a particular device 730.

The devices 730 may be any devices that may be communicatively coupled via a network 720 with the device services environment 710. For example, the devices 730 may be computing devices such as smart phones and tablet computers, automobiles, appliances such as washers and driers, industrial sensors, switches, control systems, etc. In one example, each of the devices 730 may communicate over the network 720 to store data reflecting the operations of the particular device 730 and/or to request processing provided by, for example, network services server 750. While FIG. 7 depicts three devices 730, it will be appreciated that any number of devices 730 may access the device services environment 710 via the gateway server 740. Further it will be appreciated that the devices 730 may employ various different communication protocols. For example, some devices 730 may transport data using TCP, while others may communicate data using UDP. Some devices 730 may use MQTT, while others may use CoAP, and still others may use HTTPs. It will also be appreciated that each of devices 730 may be programmed to send and receive particular functions or commands in its requests that are not compatible with other devices or even the systems within device services environment 710. The gateway server 740 may be programmed to receive and, if needed, attend to converting such requests for processing with the device services environment 710.

Figure 8:
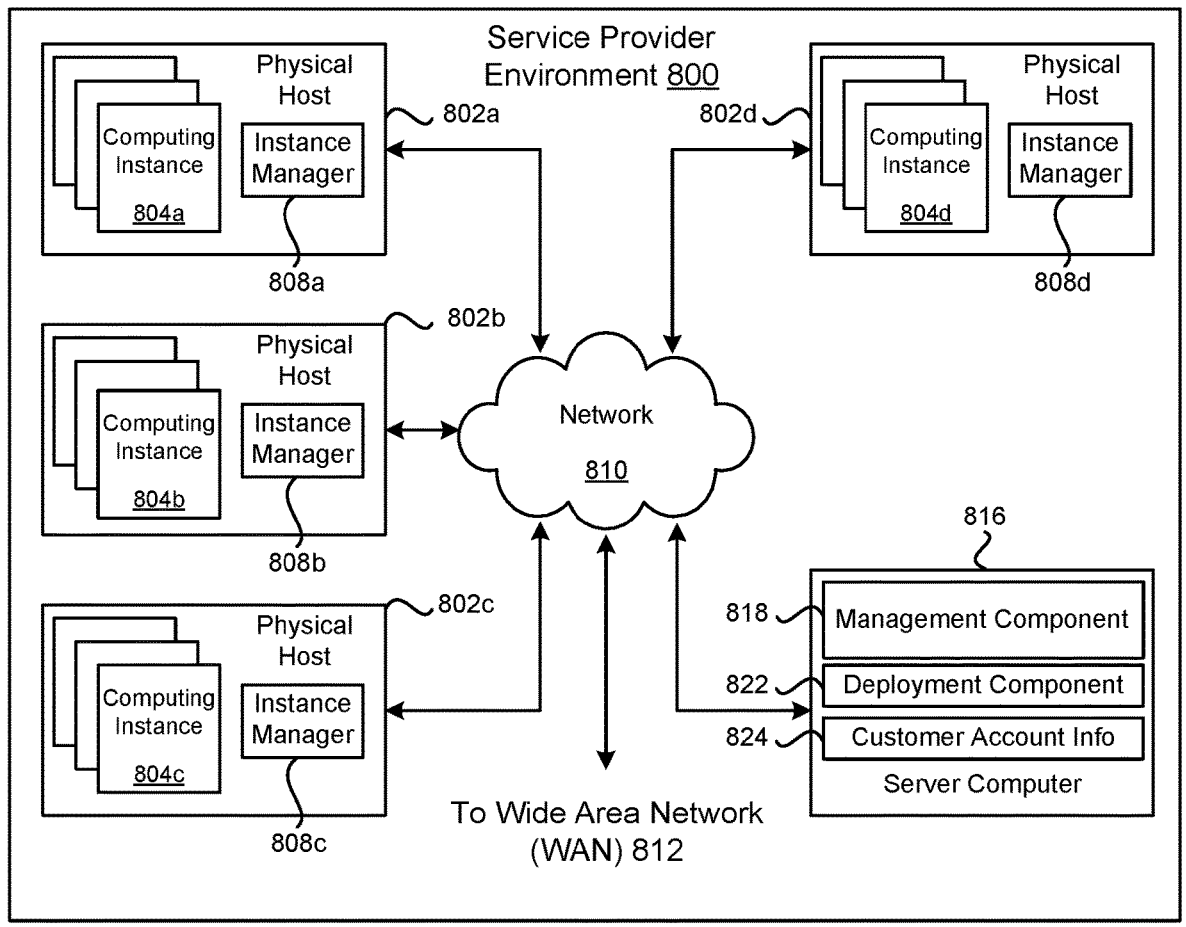
FIG. 8 is a block diagram that illustrates an example service provider environment.

FIG. 8 is a block diagram illustrating an example service provider environment 800 that may be used to implement the device services environment described above. The service provider environment 800 may include computing resources that may include physical hosts 802a-d, computing instances 804a-d, virtualized services, and other types of computing resources which may be available for purchase and use by customers of a computing service provider. The computing resources may have many different configurations of processor capabilities, main memory, disk storage, and operating system. In particular, the service provider environment 800 depicted illustrates one environment in which the technology described herein may be used.

The service provider environment 800 may be one type of environment that includes various virtualized service resources that may be used, for instance, to host computing instances 804a-d. For example, the service provider environment 800 may offer virtual or hardware devices, database resources and instances, file or block data storage resources, and/or networking resources, such as load balancing resources, domain name service ("DNS") resources, virtual private cloud ("VPC") resources, virtual local area network ("VLAN") resources, and/or other types of hardware and software computing resources or network services on a permanent or as-needed basis. The computing resources can also include, but are not limited to, computing instances 804a-d and images, security groups, option groups, gateways, option sets, network access control lists ("ACLs"), subnets, storage buckets, network interfaces, snapshots, spot market requests, and storage volumes.

The computing resources described above may be provided in one particular implementation by one or more data centers operated by a service provider. As known to those skilled in the art, data centers are facilities utilized to house and operate computer systems and associated components. Data centers also typically include redundant and backup power, communications, cooling, and security systems. The data centers can be located in geographically disparate regions, and can also be connected to various other facilities, such as co-location facilities, and various wide area networks 812 ("WANs"), such as the Internet.

The service provider environment 800 may be capable of delivery of computing, storage and networking capacity as a software service to a community of end recipients. In one example, the service provider environment 800 may be established for an organization by or on behalf of the organization. That is, the service provider environment 800 may offer a "private cloud environment." In another example, the service provider environment 800 may support a multi-tenant environment, wherein a plurality of customers may operate independently (i.e., a public cloud environment). Generally speaking, the service provider environment 800 may provide the following models: Infrastructure as a Service ("IaaS"), Platform as a Service ("PaaS"), and/or Software as a Service ("SaaS"). Other models may be provided. For the IaaS model, the service provider environment 800 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the service provider environment 800. End customers may access the service provider environment 800 using networked client devices, such as desktop computers, laptops, tablets, smartphones, etc. running web browsers or other lightweight client applications, for example. Those familiar with the art will recognize that the service provider environment 800 may be described as a "cloud" environment.

The particularly illustrated service provider environment 800 may include a plurality of server computers 802a-d. While four server computers are shown, any number may be used, and large data centers may include thousands of server computers. The service provider environment 800 may provide computing resources for executing computing instances 804a-d. Computing instances 804a-d may, for example, be virtual machines. A virtual machine may be an instance of a software implementation of a machine (i.e. a computer) that executes applications like a physical machine. In the example of a virtual machine, each of the server computers 802a-d may be configured to execute an instance manager 808a-d capable of executing the instances. The instance manager 808a-d may be a hypervisor, virtual machine monitor (VMM), or another type of program configured to enable the execution of multiple computing instances 804a-d on a single server. Additionally, each of the computing instances 804a-d may be configured to execute one or more applications.

One or more server computers 816 may be reserved to execute software components for managing the operation of the service provider environment 800 and the computing instances 804a-d. For example, a server computer 816 may execute a management component 818. A customer may access the management component 818 to configure various aspects of the operation of the computing instances 804a-d purchased by a customer. For example, the customer may setup computing instances 804a-d and make changes to the configuration of the computing instances 804a-d.

A deployment component 822 may be used to assist customers in the deployment of computing instances 804a-

*d*. The deployment component 822 may have access to account information associated with the computing instances 804*a-d*, such as the name of an owner of the account, credit card information, country of the owner, etc. The deployment component 822 may receive a configuration from a customer that includes data describing how computing instances 804*a-d* may be configured. For example, the configuration may include an operating system, provide one or more applications to be installed in computing instances 804*a-d*, provide scripts and/or other types of code to be executed for configuring computing instances 804*a-d*, provide cache logic specifying how an application cache should be prepared, and other types of information. The deployment component 822 may utilize the customer-provided configuration and cache logic to configure, prime, and launch computing instances 804*a-d*. The configuration, cache logic, and other information may be specified by a customer accessing the management component 818 or by providing this information directly to the deployment component 822.

Customer account information 824 may include any desired information associated with a customer of the multi-tenant environment. For example, the customer account information may include a unique identifier for a customer, a customer address, billing information, licensing information, customization parameters for launching instances, scheduling information, etc. As described above, the customer account information 824 may also include security information used in encryption of asynchronous responses to API requests. By "asynchronous" it is meant that the API response may be made at any time after the initial request and with a different network connection.

A network 810 may be utilized to interconnect the service provider environment 800 and the server computers 802*a-d*, 816. The network 810 may be a local area network (LAN) and may be connected to a Wide Area Network (WAN) 812 or the Internet, so that end customers may access the service provider environment 800. The network topology illustrated in FIG. 8 has been simplified, many more networks and networking devices may be utilized to interconnect the various computing systems disclosed herein.

Figure 9:
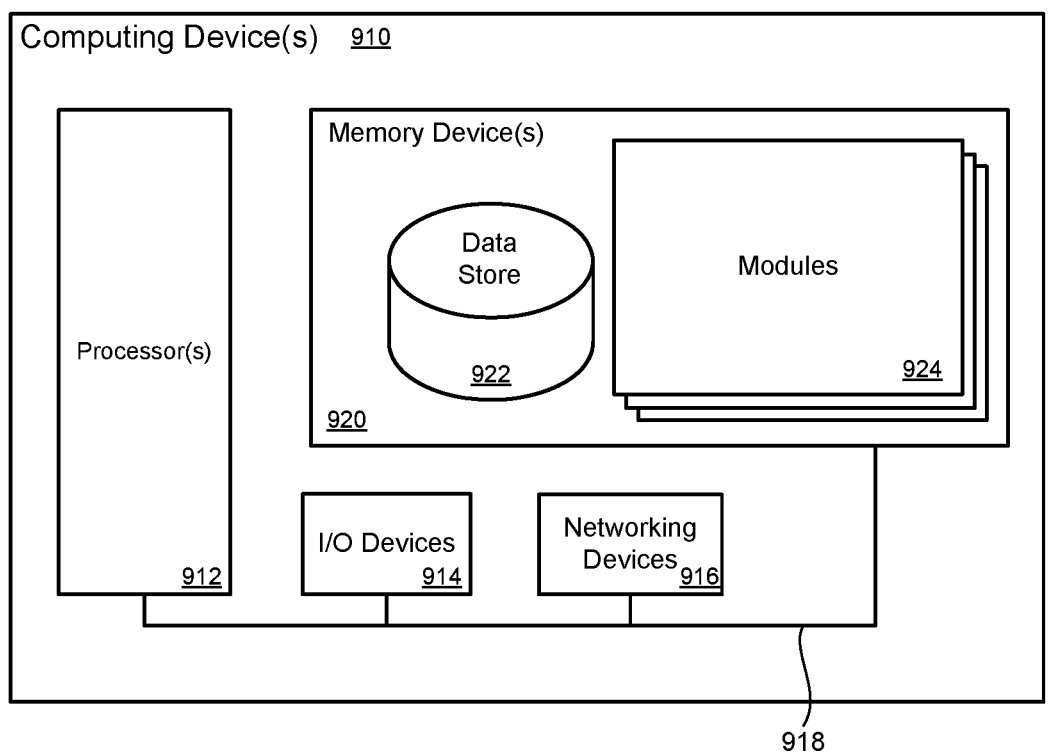
FIG. 9 is block diagram illustrating an example of a computing device that may be used to execute a method for connecting a device to a local wireless network.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules 924 that are executable by the processor(s) 912 and data for the modules 924. In one aspect, the memory device 920 may include a default network module, a configuration server, and other modules. In another aspect, the memory device 920 may include a network connect module and other modules. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high-level programming languages that are compiled, interpreted or executed using a hybrid of the methods.

The computing device may also have access to I/O (input/output) devices 914 that are usable by the computing devices. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor(s) 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory device 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media.

Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. An Internet of Things (IoT) device configured to communicate with an IoT network via a local wireless network, comprising:
    at least one processor; and
    one or more memories including instructions that, in response to execution by the at least one processor, cause the IoT device to:
        retrieve, from device memory; a preinstalled network configuration for a default wireless network, wherein the preinstalled network configuration includes preconfigured network credentials for the default wireless network;
        connect to the default wireless network using the preconfigured network credentials for the default wireless network;
        obtain a local network configuration for the local wireless network from a configuration server included in the default wireless network;
        connect to the local wireless network using local network credentials included in the local network configuration;
        in response to being configured for the local wireless network, re-configure as a node of the default wireless network to provide a second device with an access point to the default wireless network;
        receive a request from the second device to provide the local network configuration; and
        host an instance of the configuration server on the IoT device to allow the second device to obtain the local network configuration for the local wireless network from the instance of the configuration server via the default wireless network and connect to the local wireless network.

2. The IoT device as in claim 1, wherein obtaining the local network configuration from the configuration server further comprises connecting to the configuration server using either: a network address specified in the preinstalled network configuration, or a network address specified during network protocol setup with the default wireless network.

3. The IoT device as in claim 1, further comprising performing mutual authentication with the configuration server using a device certificate preinstalled on the device.

4. The IoT device as in claim 1, wherein the one or more memories including instructions that, in response to execution by the at least one processor, cause the IoT device to authenticate a cryptographic signature used to sign the local network configuration.

5. A computer implemented method, comprising:
    identifying, by a first device, a preinstalled network configuration for a default wireless network located in device memory, the first device being an Internet of Things (IoT) device;
    connecting, by the first device, to the default wireless network using the preinstalled network configuration;
    obtaining, by the first device, a local network configuration for a local wireless network from a configuration server accessed via the default wireless network;

connecting, by the first device, to the local wireless network using the local network configuration;

in response to being configured for the local wireless network, registering, by the first device, as a node of the default wireless network to provide a second device with an access point to the default wireless network;

receiving a request from the second device to provide the local network configuration; and executing, by the first device, an instance of the configuration server to allow the second device to obtain the local network configuration for the local wireless network from the instance of the configuration server via the default wireless network and connect to the local wireless network.

6. The method as in claim 5, wherein identifying the preinstalled network configuration for the default wireless network further comprises determining first that the local network configuration is not stored on the device memory.

7. The method as in claim 5, wherein obtaining the local network configuration further comprises connecting to the configuration server using mutual authentication, wherein the mutual authentication includes (i) device performed verification of the configuration server and (ii) configuration server performed verification of a device.

8. The method as in claim 5, further comprising:
configuring a user device to host the configuration server to allow the first device to connect to the user device and obtain the local network configuration, wherein the configuration server is assigned an internal network address associated with the default wireless network; and
installing a server certificate on the user device used to perform mutual authentication with the first device.

9. The method as in claim 8, wherein the configuration server, via the user device, prompts a user to provide the local network configuration for the local wireless network.

10. The method as in claim 5, wherein the default wireless network directs a request for the local network configuration received from the first device to the configuration server hosted in a device services environment.

11. The method as in claim 5, wherein connecting to the default wireless network further comprises:
identifying a default network identifier for the default wireless network in the preinstalled network configuration; and
sending a network probe request to determine availability of the default wireless network specified by the default network identifier.

12. The method as in claim 11, wherein the default network identifier included in the preinstalled network configuration includes identifying information used by a default network access point to identify a device requesting to connect to the default wireless network.

13. The method as in claim 5, wherein connecting to the default wireless network further comprises:
identifying network credentials for the default wireless network in the preinstalled network configuration; and
providing the network credentials to a default network access point for authentication.

14. The method as in claim 5, wherein identifying the local network configuration for the local wireless network further comprises:

retrieving a network address for the configuration server from the preinstalled network configuration; and
sending a request for the local network configuration to the configuration server.

15. The method as in claim 14, further comprising:
identifying a device certificate preinstalled on the device memory; and
providing the device certificate for authentication as part of the request for the local network configuration.

16. The method as in claim 5, further comprising storing the local network configuration to the device memory, wherein a subsequent network configuration procedure identifies the local network configuration in the device memory and connects to the local wireless network using the local network configuration.

17. A non-transitory machine readable storage medium having instructions embodied thereon, the instructions when executed by one or more processors:
retrieve, by a first device, a preinstalled network configuration for a default wireless network from device memory of the first device, wherein the preinstalled network configuration includes preconfigured network credentials for connecting to the default wireless network, wherein the first device is an Internet of Things (IoT) device configured to communicate with an IoT network via a local wireless network;
connect, by the first device, to the default wireless network using the preconfigured network credentials;
connect, by the first device, to a configuration server to obtain a local network configuration for the local wireless network; and
in response to being configured for the local wireless network, re-configure, by the first device, as a node of the default wireless network to provide a second device with an access point to the default wireless network that allows the second device, based at least in part on a request from the second device to provide the local network configuration, to connect to the default wireless network via the access point and obtain the local network configuration for the local wireless network from an instance of the configuration server hosted on the first device.

18. The non-transitory machine readable storage medium in claim 17, wherein the first device and the second device are configured to obtain the local network configuration from the configuration server via the default wireless network when not configured to connect to the local wireless network.

19. The non-transitory machine readable storage medium in claim 18, wherein the instructions that when executed by the one or more processors further:
accept, by the first device, a connection request from the second device requesting to connect to the default wireless network and access the configuration server hosted on the first device to obtain the local network configuration.

20. The non-transitory machine readable storage medium in claim 19, wherein the instructions that when executed by the one or more processors further:
authenticate the second device requesting to connect to the default wireless network using a device certificate provided by the second device.

* * * * *